June 14, 1960   J. S. NACHTMAN   2,940,886
METHOD OF PRODUCING REFRACTORY FIBER LAMINATE
Original Filed Feb. 25, 1953   3 Sheets-Sheet 1

INVENTOR.
JOHN S. NACHTMAN
BY
ATTORNEYS

June 14, 1960     J. S. NACHTMAN     2,940,886
METHOD OF PRODUCING REFRACTORY FIBER LAMINATE
Original Filed Feb. 25, 1953     3 Sheets-Sheet 2
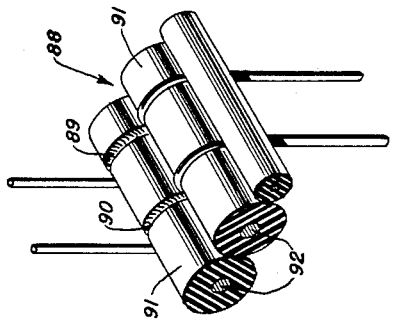
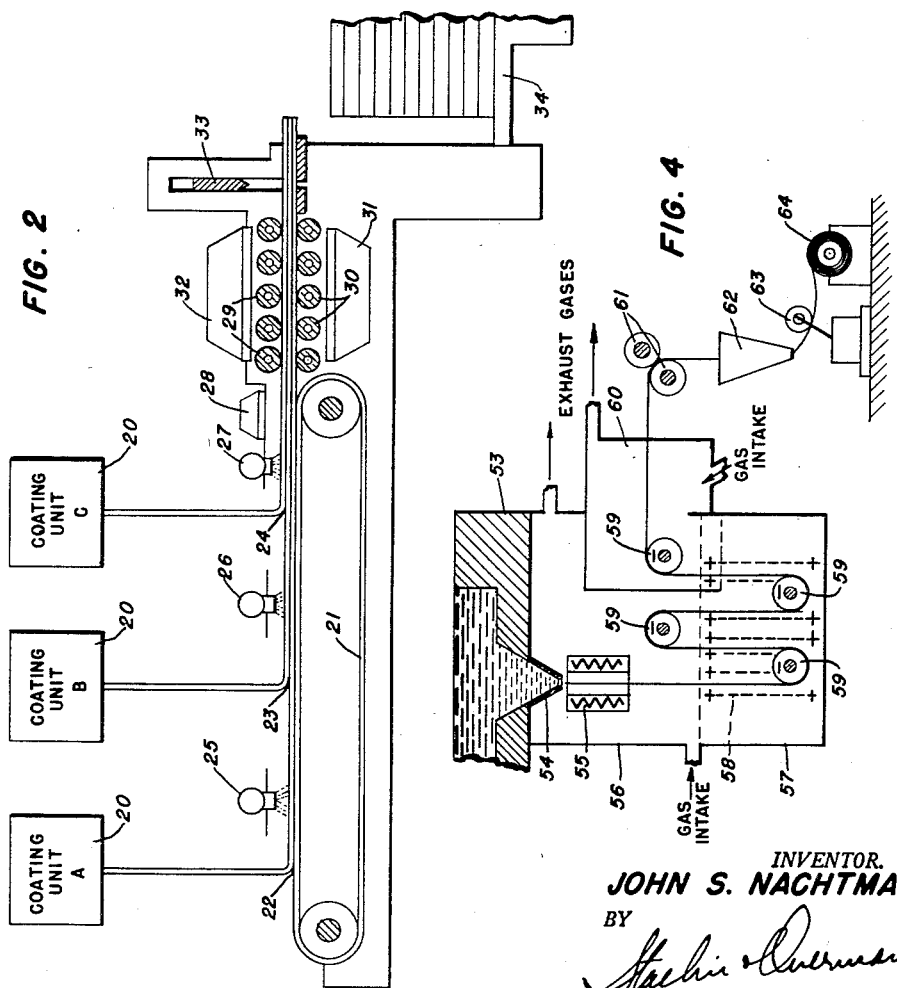
INVENTOR.
JOHN S. NACHTMAN
BY
ATTORNEYS June 14, 1960  J. S. NACHTMAN  2,940,886
METHOD OF PRODUCING REFRACTORY FIBER LAMINATE
Original Filed Feb. 25, 1953  3 Sheets-Sheet 3

INVENTOR.
JOHN S. NACHTMAN
BY
ATTORNEYS

United States Patent Office 2,940,886
Patented June 14, 1960

2,940,886

METHOD OF PRODUCING REFRACTORY FIBER LAMINATE

John S. Nachtman, 2801 Quebec St. NW., Washington, D.C.

Original application Feb. 25, 1953, Serial No. 338,923, now Patent No. 2,699,415, dated Jan. 11, 1955. Divided and this application Jan. 10, 1955, Ser. No. 481,044

8 Claims. (Cl. 154—91)

(Granted under Title 35, U.S. Code (1952), sec. 266)

The invention described herein may be manufactured and used by or for the Government of the United States of America for governmental purposes without the payment of royalties thereon or therefor.

This invention relates to a new and improved method for continuously producing coated refractory fibers which can be used to produce a refractory fiber laminate.

This application is a division of my copending application Serial Number 338,923, filed February 25, 1953, now U.S. Patent No. 2,699,415.

At the present time many advancements in the use of atomic power and jet-propulsion units have been retarded or arrested because of the lack of suitable materials. It is well known that the efficiency of a jet-propulsion unit could be materially increased provided a lightweight material was available having high strength at temperatures between 500° and 1200° F. None of the known materials have the proper physical characteristics to successfully withstand these conditions.

I have found a new and improved refractory fibrous material laminate which can withstand extreme high temperatures, for example between 500° and 1200° F., and at the same time maintain high strength characteristics. The refractory fibrous material may comprise either glass fibers, ceramic fibers or mineral fibers such as alumina fibers.

It is well known that glass fibers possess extremely high tensile strength. The ultimate tensile strength of glass fibers is known to exceed 300,000 pounds per square inch. Many attempts have been made to employ this high strength characteristic of glass fibers by embedding them in resins to make various laminates. The resins, however, are by comparison weak and flexible. When a load is applied to a fibrous glass and resin laminate, the resin because of its low tensile strength, creeps or distorts slightly, while the glass being of high tensile strength, stays in place and takes the load. In order for the glass fibers to take the load efficiently, the bond between the resin and the glass must be very strong. In practice the bond between the glass fibers and the resin has been found to fail because of slippage between the glass fibers and the resin after the laminate has been exposed to the elements and to repeated use. One cause of this slippage is the poor adhesion or non-wetting effect between glass and resin. Many attempts have been made to correct this failure by forming a better bond between the glass fibers and the laminating material. However, until my discovery, no satisfactory method for doing this was known to the art. I have found a new and improved method for producing a glass-fiber laminate having the desirable characteristic of being able to withstand high temperatures while being subjected to high strength demands.

The principal object of this invention is to provide a new and improved refractory fiber laminate suitable for use as a high strength structural material.

An important object of the invention is to provide a method for the production of refractory fiber laminate with improved physical characteristics, at high temperatures, far superior to any known fibrous laminate.

A further object of the invention is to provide a novel method for continuously and uninterruptedly applying a coating upon continuously moving refractory fibers as they emerge from a furnace or other source of molten refractory material, and are in what may be considered as a nascent state.

Another object of the invention is to provide a novel method for effecting improved bonding between continuously moving refractory fibers and diverse materials.

Still a further object of the invention is to provide a novel method for embedding continuously moving refractory fibers in a diverse material, or metal, to form a composite structure having the strength of the refractory fibers and properties of the diverse material or metal.

I have found that the above-mentioned objects and other desirable advantages may be attained by the method of my invention which comprises, coating the continuously moving refractory fibers as they leave the bushing in the refractory furnace, with at least one metallic and/or inorganic coating, and then bonding the moving coated fibers together to form a laminate, by applying at least one bonding material comprising a metallic and/or organic, and/or inorganic bonding material.

It is apparent from the foregoing, that the process is of wide application and is susceptible of great variations. For example, the coating material may be any desired metal or inorganic compound, or combination of metals, inorganic compounds, and organic compounds.

The following named metals and/or alloys thereof are examples of the metals that can be applied to the moving refractory fibers; alone or in combination: titanium, copper, nickel, zinc, chromium, iron, tin, molybdenum, zirconium, aluminum, lead, magnesium, et cetera. In addition to these metals, metallic oxide coatings can be formed, such as by disassociation of metallo-oxychlorides, metallo-oxyhydrides and metal hydrides.

The aforementioned coatings can be applied by well known means, for example, by molten baths, metallizing, gas plating, vapor deposition, fused salts and/or electrolytes.

Inorganic compounds which can be applied alone or in combination, as a coating on the moving refractory fibers as they emerge from the bushing of the refractory furnace are as follows: borates, zirconates, metallo-fluoroborosilicates, titanates, metal phosphates, phosphates, metallo-oxychlorides, et cetera.

The inorganic coating can be applied by well known means, for example, by a spraying apparatus, by a dipping or molten bath apparatus, et cetera.

All of the aforementioned coatings, or combinations thereof, can be applied on the continuously moving refractory fibers after they emerge from the bushing in the refractory furnace, and are in what may be considered a nascent state.

It may be desirable in some instances to apply a conductive coating to the moving refractory fibers prior to the final coating to assist in the application of said final coating. Also, it may be desirable in some instances to add a metal or a metal oxide to the refractory mixture to render the refractory fibers receptive to a subsequent coating or to subject the moving refractory fibers to an etching solution prior to the coating.

In some cases it is desirable to subject the moving fibers to either inert, reducing and/or non-oxidizing gases substantially immediately as they emerge from the bushing of the furnace. The gases can be used when certain physical properties are desired and when the coating apparatus is located a distance away from the bushing. They may also be used when it is desirable to prevent exposure of the moving fibers, for any long period of time, to an atmosphere that may injuriously affect the physical properties of the refractory fibers.

It is well known that when fibers are drawn from a metal-bearing, molten glass mixture that the metal ions tend to migrate to the surface of the glass fibers to form a metallic film. See for example "The Electrical Properties of Glass Fiber Paper—II," NRL Report 4042, by Thomas D. Callinan and Robert T. Incas, Naval Research Laboratory, Washington, D.C. When such fibers are cooled by exposure to the atmosphere the film tends to oxidize and form a metallic oxide coating. Similar phenomena occur with respect to ceramic and mineral fibers. Therefore, a second function of the aforementioned gases is to reduce such oxide films or coatings to a base metal film and to thereby put the fibers in a more receptive condition for the coating.

The inert, reducing and/or non-oxidizing gases must be free of all moisture and impurities to prevent them from attacking the refractory fibers. They can be maintained at any temperature desired, depending on the final physical properties that it is desired to obtain in the fibers. For example, when applying a metallic coating it may be desirable to maintain the temperature of the fibers at a temperature comparatively higher than when applying an inorganic coating. The inorganic coatings may be applied relatively close to the bushing, and in this case no gases would be needed to add additional heat to the hot fibers emerging from the bushing.

One or more coatings of metal and/or inorganic materials, or an inorganic material followed by an organic material, may be applied to the refractory fibers, if desired, before they are bonded together. In such cases, if desired, the surfaces of the refractory fibers can be protected from any harmful atmosphere by surrounding the fibers between coatings with either an inert, reducing and/or non-oxidizing gas by any suitable means such as by circulating such gas through chamber means through which the fibers are passed. As explained above, this gas may also be heated, if desired, to maintain the fibers at any desired temperature.

The most suitable bonding materials for application on the coated refractory fibers to form a laminate are the well known low melting point metals or eutectic of such metals, such as lead, tin, aluminum, magnesium, indium, cadmium, copper, antimony, bismuth and alloys thereof. The bonding material can also be an inorganic material such as, a phosphate, a metal phosphate, a metallo-silicate, a complex titanate, a borate, et cetera, or a high temperature organic material, such as a polyester resin, a phenolic resin, a fluoro-ethylene compound, a triallyl cyanurate, a methyl methacrylate, a silicone or epoxy.

Instead of using a bonding material, the coated refractory fibers can be bonded together to form a laminate by the application of heat alone, or by heat and pressure.

The bonding material can be applied to the coated refractory fibers to form a laminate by processes utilizing spraying, brushing, metallizing, electroplating, hot molten baths, et cetera. These processes for applying the bonding material are well known and the choice depends upon the particular bonding material used and/or the desired structural shape of the laminate.

Other objects and many of the attendant advantages of this invention will be readily appreciated as the same becomes better understood by reference to the following detailed description when considered in connection with the accompanying drawings wherein:

Fig. 2 is a vertical cross-sectional view through an apparatus for producing a laminate according to the teachings of this invention.

Fig. 4 is a side view in elevation partially sectioned and diagrammatic, showing an electroplating means for coating the refractory fibers.

Fig. 7 is a perspective view of the type of contact rolls used in the coating apparatus of Figs. 1 through 6.

Figure 1:
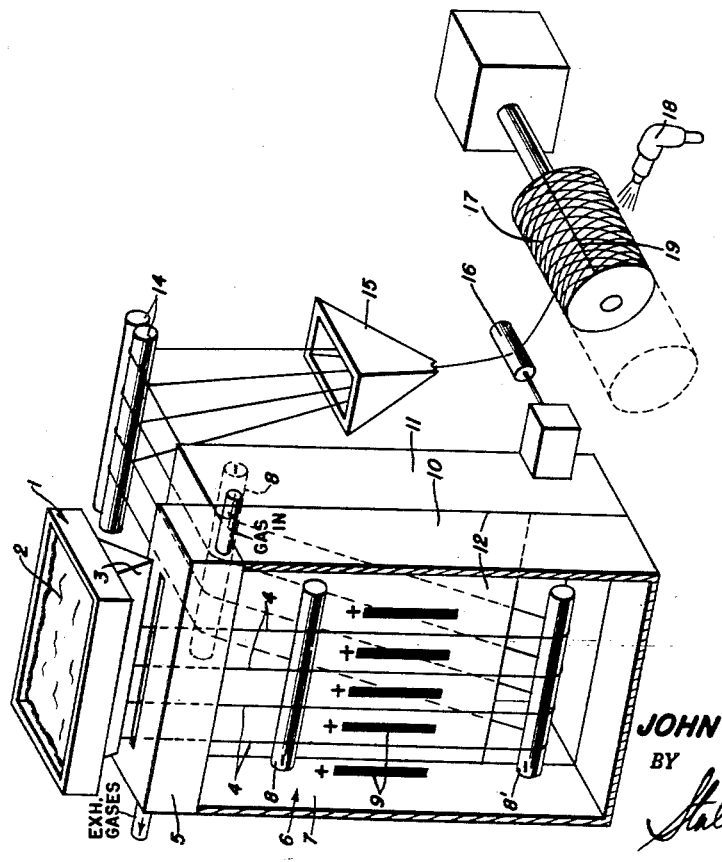
Fig. 1 is a perspective view of an embodiment of the present invention, showing in section an electrolytic means for coating the refractory fibers.

Referring more particularly to Fig. 1 of the drawings, reference character 1 represents a furnace in which a supply body 2 of molten metal-bearing refractory material is contained. On the lower side of the furnace 1 is a platinum bushing 3 which is provided with a series of orifices through which the refractory fibers 4 are drawn. The bushing 3 can be heated by an electric heating element to keep the molten refractory material at any desired temperature.

After leaving the bushing 3, the refractory fibers 4 enter a gas chamber 5 which may contain either inert, non-oxidizing or reducing gases. As aforementioned, these gases may be used to control the temperature of the fibers to obtain the desired final physical properties, and to prepare the fibers for subsequent coatings. If the coating apparatus is located in the immediate vicinity of the bushing, or relatively close thereto, no gases may be necessary and the gas chamber 5 may be omitted.

The refractory fibers 4 pass through the gas chamber 5 into a tank 6 in which there is a suitable electrolytic bath 7. The cathode is designated as 8 and comprises a series of power-driven guide rolls. These rolls can be constructed as shown by Fig. 7 so that only that part of the surface of the roll which contacts the fibers is conductive. A more detailed description of these rolls is included infra. Anodes 9 are provided in the tank 6, and, as illustrated, the tank 6 is made with two chambers 10 and 11 separated by a plate 12 which extends downwardly from the gas chamber 5 nearly to the lower guide roll 8'. Power-driven tension rolls 14 are provided to pull the refractory fibers through the furnace bushing and then through the gas and electrolyte chambers. The tension rolls 14 and the guide rolls 8 and 8' are electrically synchronized to provide constant speed and tension on the fibers as they proceed through the coating apparatus. After passing through the tension rolls 14, the coated refractory fibers are collected into a strand by the guide 15. From the guide 15 the strand of fibers passes over an idler roll 16 and then onto conventional reciprocating and rotating collecting reel 17. The idler roll 16 can be electrically integrated with the rolls 8, 8' and 14 in a well-known manner so as to provide an even tension to the fibers as they are collected on reel 17. The operation of an electrolytic bath is well known and details of the electrical circuits are therefore not disclosed.

A laminate in the form of a cylinder can be formed as the strand is wound on the reel 17, by spraying the desired bonding material onto said strand by any suitable spray means 18. If it is desired to form the laminate elsewhere, then the strand may be allowed to accumulate on the reel 17 to any desired thickness and at that point the tubular accumulation can be removed and fabricated elsewhere into a laminate.

As an alternative to the cylindrical collecting reel 17 a reel of any other desired cross-sectional shape can be used to form a laminate with a corresponding shape.

Laminates of various shapes can also be formed by cutting the accumulated refractory fiber mat off reel 17 along line 19 after it has been bonded by spray 18, and then employing a heated press and die to shape the laminate. The use of a heated press and die for such purposes is well-known in the laminating art.

Fig. 2 is illustrative of another continuously operating apparatus for carrying out my invention and shows how a plurality of coating units, generally designated by reference numeral 20, may be utilized in forming the laminate. In the embodiment illustrated, three coating units, A, B, and C, are utilized, however, it is obvious that a greater or lesser number of coating units may be used. These coating units can be of the type shown in either Figs. 1, 3, 4, 5, or 6. After the refractory fibers are coated with the desired coating material they are deposited on a conveyor 21 at the points shown as 22, 23 and 24. The conveyor 21 then moves the coated refractory fibers under spray heads 25, 26 and 27 which spray the bonding material onto the fibers, at the desired temperatures and in the desired amounts. These spray heads may be in the form of electric guns which deposit molten material upon the fibers to bond them together. A plurality of such guns can be arranged to deposit whatever amount of bonding material is desired per unit of time. The speed of the conveyor 21 may also be co-ordinated with the fibers as they are deposited on said conveyor, to produce a laminate in which the fibers are either uni-directional or undulatory in form.

The conveyor 21 carries the bonded fibers under a heater 28 which softens the bonding material so that it may be rolled or compressed to a selected thickness by means of rollers 29 and 30. Additional heaters 31 and 32 may be used to aid in the plasticizing or softening of the bonding material for the rolling step.

A reciprocating knife 33 can be utilized to cut the laminate produced by the method heretofore described into predetermined lengths. A platform 34 is situated adjacent the reciprocating knife to catch the severed pieces and to provide a place to gather such pieces in stacks preparatory to shipping them to the point of use or further processing, whichever is desired.

Figure 3:
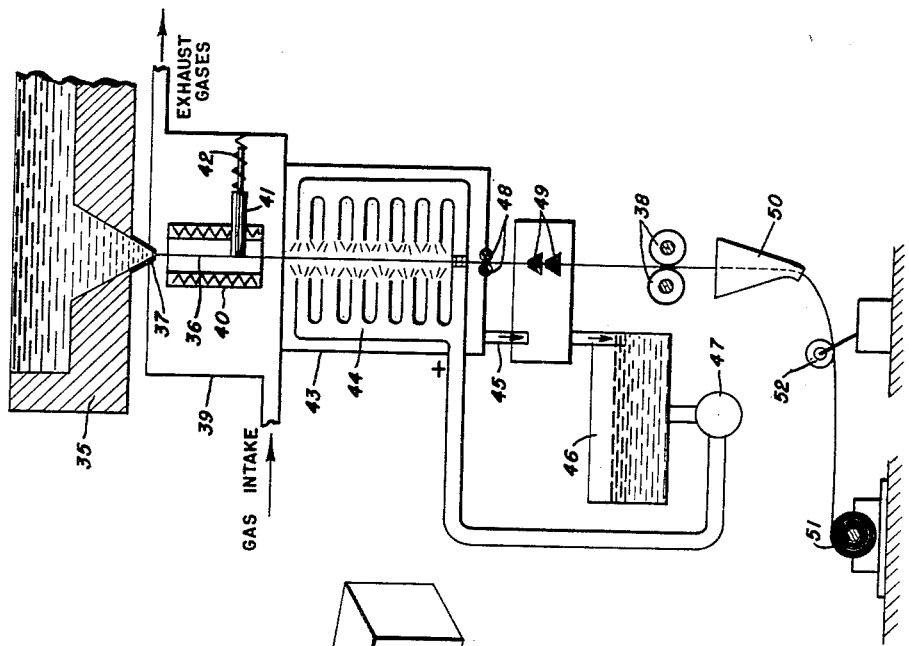
Fig. 3 is a side view in elevation partially sectioned and diagrammatic, showing an electrostatic-spray means for coating the refractory fibers.

Fig. 3 is illustrative of an electrostatic spray apparatus for carrying out the coating step in my invention. A conventional refractory furnace 35 feeds a plurality of refractory fibers 36 through orifices in a bushing 37. A set of power-driven tension rolls 38 draws the fibers through the bushing 37 and into a chamber 39 containing either inert, reducing and/or non-oxidizing gases. The function of these gases has been explained supra. An electrical heater 40 may be used within the gas chamber 39 to aid in controlling the temperature of the glass fibers.

In using this spray apparatus a metal-bearing refractory mixture is not needed. A member 41 is provided to contact the fibers as they pass through the gas chamber to impart a charge on the fibers. This member 41 may be made of either a soft metal or carbon, and can be anchored by a spring 42 to allow this member to continuously contact the fibers.

After leaving the gas chamber 39 the refractory fibers pass into a spraying chamber 43 wherein the desired coating material is applied at the desired temperature by means of spray apparatus 44. A charge opposite to that on the fibers can be applied to the coating material by any conventional means. Any unused coating material is drained off by channel 45 which deposits such unused coating material in the supply tank 46. A pump 47 is provided to deliver the coating material to the spray apparatus 44. A set of squeegee rolls 48 is provided to remove excess coating material from the continuously moving refractory fibers. In case the squeegee rolls 48 fail to remove all the excess coating material from the fibers, a wiper device 49 can be provided to assist in this operation.

After passing through the wiper device 49 and the tension rolls 38, the coated refractory fibers are run through a guide member 50 and collected into a strand. The strand of coated fibers is then wound onto a reciprocating and rotating reel 51. The tension rolls 38 and an idler roll 52 can be electrically timed to provide the proper tension in the refractory fibers to prevent breakage during the coating process.

In this apparatus, as a result of the oppositely charged fibers and particles of spray, the particles of the spray are attracted to the fibers and the latter are completely and uniformly coated.

Fig. 4 is illustrative of an electroplating apparatus for carrying out the coating step in the invention. This apparatus comprises a furnace 53, a bushing 54, an electric heater 55, and a gas chamber 56 attached to the furnace. The gas chamber 56 and heater 55 function as explained supra. After leaving the gas chamber 56 the refractory fibers pass through a fused salt bath chamber 57 containing anodes 58 of the desired coating material. When using this apparatus a metal-bearing refractory mixture will have to be used to provide a fiber that is conductive. If a non-metal-bearing refractory material is used, a pre-coating conductive film will have to be applied to the furnace of the fibers before the fibers enter the plating bath. The charge on the fibers is impressed by means of the power-driven idler rolls 59. An exit gas chamber 60 is provided for quenching and/or oxidization control purposes. The mechanical drawing power for the fibers is provided by tension rolls 61. From the tension rolls 61, the fibers pass through a conventional guide member 62, by an idler roll 63 and thence onto a reciprocating and rotating reel 64.

Figure 5:
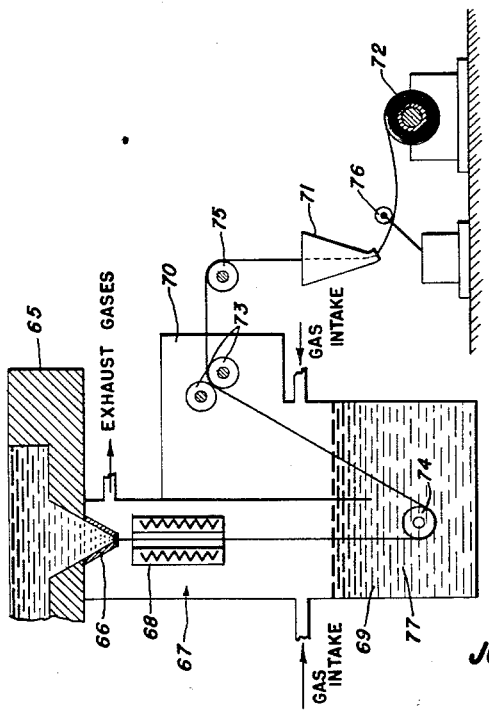
Fig. 5 is a side view in elevation partially sectioned and diagrammatic, showing a molten bath means for coating the refractory fibers.

Fig. 5 is illustrative of a dipping or molten bath apparatus for carrying out the coating step in the invention. From the conventional refractory furnace 65 and bushing 66 the refractory fibers pass successively through a gas chamber 67 having a heater 68, a bath chamber 69, a quenching gas chamber 70 and thence through a guide member 71 onto a reciprocating and rotating reel 72. The fibers are drawn through the apparatus by tension rolls 73 assisted by power driven guide rolls 74, 75 and 76. These rolls are electrically synchronized to maintain the proper tension in the fibers to prevent breakage. The coating material is indicated by reference numeral 77. The use of such a molten bath for plating purposes is well-known.

Figure 6:
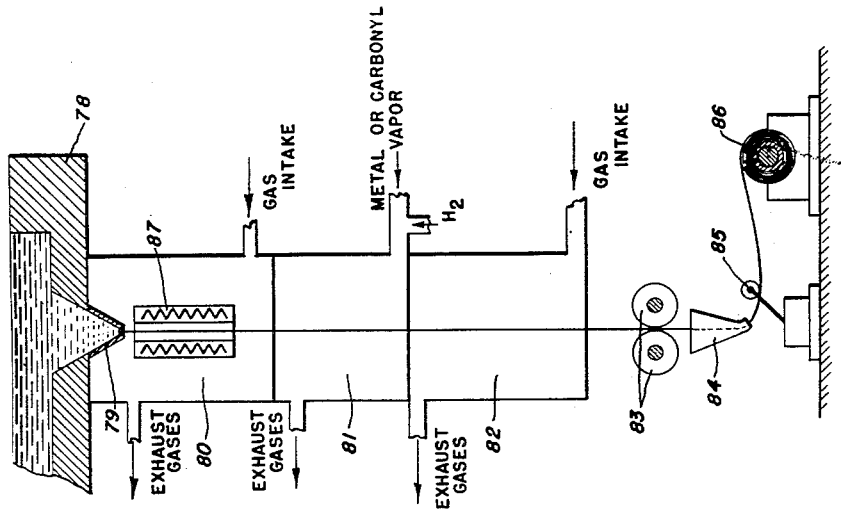
Fig. 6 is a side view in elevation partially sectioned and diagrammatic, showing a vapor deposition means for coating the refractory fibers.

Fig. 6 is illustrative of a vapor deposition apparatus for carrying out the coating step of the invention. Again the conventional refractory furnace 78, bushing 79, heater element 87, and gas chamber 80 are employed. After the refractory fibers leave the gas chamber 80, they enter a vapor deposition chamber 81 containing a metal vapor at an elevated temperature. The metal is deposited upon the moving heated refractory fibers (or substrate), the fibers acting as a condenser. The temperature of the vapors and the pressure in the deposition chamber 81 may be controlled as desired to obtain optimum coating conditions. From the deposition chamber 81 the coated fibers pass through a reducing gas chamber 82, where the desired temperature is maintained, through tension rolls 83, a guide member 84, idler roller 85, and then onto reciprocating and rotating reel 86.

The same apparatus as shown for a vapor deposition process for coating the refractory fibers could also be used for applying the coating material by a gas plating process with one exception, a heater would have to be provided to heat the substrate in the deposition chamber. This process is carried out by heating the substrate in an atmosphere of a metallic compound, such as a metal-carbonyl, or a metal hydride or an equivalent. Since the metallic compounds used are more volatile than the free metals, the temperatures required for evaporation are much lower. It is advantageous in some instances when using this method to add inert or reducing or non-oxidizing gases to the carbonyl or hydride vapors during the plating process since they act as a catalyst and hasten the metallic deposition process. The use of a gas plating or a disassociation of metal process for plating is well known in the plating art.

In the use of any of the apparatus described in the preceding Figures 1 through 6, the coating device may be placed at any desirable distance from the refractory furnace. Factors to be considered when positioning the coating device are the speed of the fibers and the temperature differential that must be maintained between the fibers and the coating material.

As previously mentioned, the refractory fibers in the apparatus of Figures 1 through 6 are drawn through the coating device in each instance by means of a set of tension rolls aided by a plurality of power-driven rolls. These rolls can be synchronized by an electrical control device to provide a constant speed as the fibers pass through the coating apparatus. The reciprocating, winding or collecting reel in each case acts as a reeling apparatus only, and not for drawing the fibers through the coating apparatus.

Fig. 7 is illustrative of a set of power-driven tension rolls 88, such as are used in the apparatus of Figures 1 through 6. Each roll can have a plurality of grooves 89, 90 in its outer surface at the points where the fibers are contacted. All of the single guide rolls shown in Figures 1 through 6 may be made with similar grooves. When using the coating process of Figures 1 or 3, the center of the guide and tension rolls 92 and the aforementioned grooves 89 and 90, should be made of a conductive metal, while the other parts 91 of the rollers should be made of a non-conductive material to prevent the accumulation of coating materials on these rolls.

In the claims the term "metallic material" is intended to mean either a metal or an alloy. The term "inorganic substance" as used in the claims is intended to include elemental metals, alloys and inorganic compounds. The word "pure" refractory fibers as used in the claims is intended to mean that prior to coating, the surfaces of the fibers are susbtantially free from harmful or foreign films, such as organic films, and oxidized films caused by exposure to atmospheric conditions for an undue length of time; and other impurities. As explained above, the fibers are protected against the formation of such films, by surrounding them with inert gases, et cetera, or by applying the initial coating in relatively close proximity to the bushing before the fibers have a chance to be unduly exposed to any harmful atmosphere, whereby the fibers are retained substantially in the pure state.

In Figures 1 through 6 only one coating is shown being applied but as previously mentioned it is contemplated that a plurality of coatings may be applied before the bonding operation is performed. The plurality of coatings may comprise any of the above disclosed metallic and/or inorganic materials, or they may comprise any of these inorganic materials followed by an organic material selected from the group of organic bonding materials disclosed above. In order to apply a plurality of coatings, it is merely necessary to pass the fibers through additional coating units in series. If the coating units of the series are spaced relatively far apart, it will be desirable to surround the fibers as they pass between units with an inert, reducing, and/or non-oxidizing gas. This may be accomplished by means of a chamber through which the fibers are passed and gas supply means such as previously described.

Obviously many modifications and variations of the present invention are possible in the light of the above teachings. It is therefore to be understood that within the scope of the appended claims the invention may be practiced otherwise than as specifically described.

I claim:

1. A continuous method for producing a coated refractory fiber comprising the steps of drawing a continuous fiber through a bushing from a molten metal bearing refractory material, continuously drawing successive adjacent portions of said fiber through an electrolytic bath while said fiber is still in the pure condition existent at the time it emerged from the bushing and electrodepositing a metal coating thereon.

2. A continuous method for producing a coated refractory fiber comprising the steps of forming a continuous fiber from a molten metal bearing refractory material, continuously drawing successive adjacent portions of said fiber, while still in the pure condition existent at the time of formation through a heated pure, dry non-oxidizing gas and then through an electrolytic bath, and electrodepositing a metal coating on said successive portions from said bath.

3. A continuous method for producing a coated refractory fiber as set forth in claim 1 in which the said metal coating is a high melting point metal, and applying over said high melting point metal, a coating of a low melting point metal capable of being bonded by heat and pressure.

4. A method for producing a coated refractory fiber as set forth in claim 1 wherein the refractory material is glass.

5. A continuous method for producing coated refractory fibers comprising the steps of drawing continuous, moving, pure fibers from a molten metal bearing refractory material, successively drawing successive adjacent portions of said fibers, while still in the pure condition existent at the time of formation through an electrolytic bath for electrodeposition of a coating material on the surface of each, and collecting said fibers into a continuous strand.

6. A continuous method for producing an article of coated refractory fibers comprising the steps of drawing continuous, moving, pure fibers from a molten metal bearing refractory material, successively drawing successive adjacent portions of said fibers, while still in the pure condition existent at the time of formation through an electrolytic bath for electrodeposition of a coating material on the surface of each, collecting said fibers into a continuous strand, and collecting said strand into a cylindrical form.

7. A continuous method for producing an article of coated refractory fibers comprising the steps of drawing continuous, moving, pure fibers from a molten metal bearing refractory material, successively drawing successive adjacent portions of said fibers while still in the pure condition existent at the time of formation through an electrolytic bath for electrodeposition of a coating material on the surface of each, collecting said fibers into a continuous strand, collecting said strand into layers, spraying the strand portions being collected with a bonding material to effect an integral relationship thereof, heating said bonded strand portions to soften the bonding material and then pressure shaping said layers of strand to desired form.

8. A method for producing a coated refractory fiber comprising the steps of forming a continuous fiber of said refractory material from a molten bath of said refractory material and a reducible metal oxide, continuously reacting successive adjacent portions of said fiber with a hot dry pure reducing gas while said fiber is in the pure condition existent at the time of its formation whereby to reduce said metal oxides at the surface of said refractory fiber to a base metal film, and then electrodepositing a second layer of a metal over the surface of the base metal film on said refractory fiber condition as obtained from the reducing step.

(References on following page)

References Cited in the file of this patent

UNITED STATES PATENTS

| | | |
|---|---|---|
| 1,547,394 | Hoyt | July 28, 1925 |
| 2,264,285 | Bennett | Dec. 2, 1941 |
| 2,339,928 | Hood | Jan. 25, 1944 |
| 2,544,667 | Goebel et al. | Mar. 13, 1951 |
| 2,546,230 | Modigliani | Mar. 27, 1951 |
| 2,578,667 | Brennan | Dec. 18, 1951 |
| 2,594,693 | Smith | Apr. 29, 1952 |
| 2,616,165 | Brennan | Nov. 4, 1952 |
| 2,644,780 | Simkins et al. | July 7, 1953 |
| 2,699,415 | Nachtman | Jan. 11, 1955 |

FOREIGN PATENTS

| | | |
|---|---|---|
| 849,842 | France | Dec. 2, 1939 |

OTHER REFERENCES

"Metallizing Glass," by A. J. Monack, published in "The Glass Industry" on January 1947, pp. 43 and 44.